Figure 1:
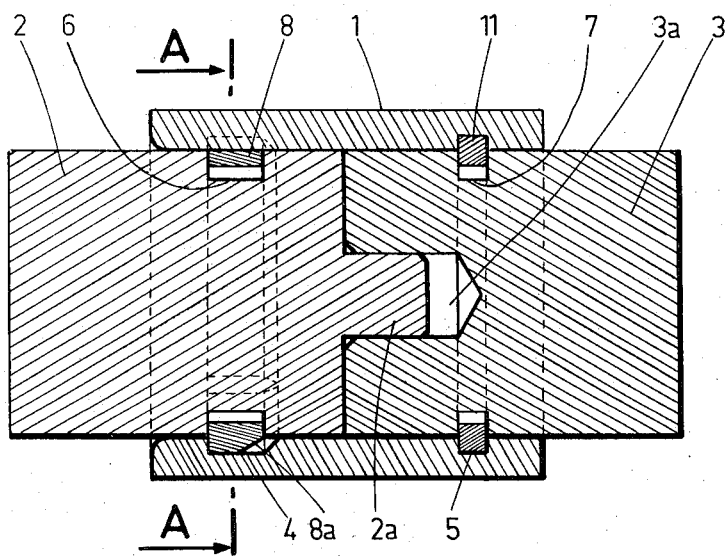

United States Patent [19]
Laurent et al.

[11] 3,827,814
[45] Aug. 6, 1974

[54] DEVICE FOR A QUICK CONNECTION OF TRACTION ELEMENTS

[75] Inventors: Jean Laurent, Saint Germain-en-lave; Claude Duconge, Le Vesinet, both of France

[73] Assignee: Institut Francais Du Petrole Des Carburants Et Lubrifiants, Rueil-Malmaison (Hauts-de-Seine), France

[22] Filed: Sept. 24, 1971

[21] Appl. No.: 183,376

[30] Foreign Application Priority Data
Oct. 1, 1970 France .......................... 70.35617

[52] U.S. Cl. ................. 403/301, 403/341, 403/350
[51] Int. Cl. ............................................. F16b 7/00
[58] Field of Search ....... 287/104, DIG. 8, 7, 52.09, 287/108, 119; 285/314, 321, 277; 279/81, 71; 403/301, 377, 350, 341, 314, 351, 352

[56] References Cited
UNITED STATES PATENTS

| | | | |
|---|---|---|---|
| 502,686 | 8/1893 | Tilton | 287/108 |
| 1,054,149 | 2/1913 | Tebbets | 287/52.09 |
| 2,599,003 | 6/1952 | Leonard | 285/314 |
| 3,129,777 | 4/1964 | Haspert | 285/307 |
| 3,391,954 | 7/1968 | Callahan | 287/52.09 |

Primary Examiner—Andrew V. Kundrat
Attorney, Agent, or Firm—Craig & Antonelli

[57] ABSTRACT

Device for connecting end portions of two tubular elements through a connecting sleeve by securing the end portion of each element to said sleeve, comprising a deformable ring which, in its expanded position, locks said element against a translation motion by engagement into facing slots of the element and the sleeve and whose peripheral wall has recesses adapted to cooperate with internal bosses provided in the slot of the sleeve so as to compress said ring by rotation of the sleeve with respect to the element.

9 Claims, 3 Drawing Figures

PATENTED AUG 6 1974

3,827,814

DEVICE FOR A QUICK CONNECTION OF TRACTION ELEMENTS

This invention relates to a detachable device for a quick connection of two elements and more particularly to a device for connecting the end parts of two elements to the internal wall of a coupling sleeve.

Amongst the known coupling processes, there can be mentioned those according to which the fixation in location of both elements to be connected is achieved by means of collars pressed against the external surface of the sleeve. There can also be mentioned those wherein the end parts of both elements are provided with threads and are screwed on the threaded parts of the connection sleeve. A third connection method consists of securing the elements against motion inside the sleeve by means of screws placed in recesses arranged radially in the bodies of said elements and said connection sleeve.

The device of this invention, as compared to the above-mentioned ones, has the advantages of a simple design and of an unexpensive manufacture while nevertheless withstanding the axial stresses exerted on the elements (e.g traction forces) and making possible an instantaneous disconnection of at least one of the connected elements.

The device according to the invention comprises means for securing at least one of the elements to the sleeve. This means includes at least one deformable ring housed, in an expanded position, in two slots facing each other. One slot is provided in the internal wall of the sleeve and contains bosses. The other slot is provided in the external wall of the element. The ring comprises recesses arranged in its external wall. Their internal surface cooperates with the bosses for compressing the ring when the sleeve is driven in rotation with respect to the element. The recesses comprise a first surface portion of a depth substantially equal to the height of the bosses and a second surface portion of decreasing depth extending the first one to the external wall of the ring. In locking position, the bosses are entirely housed in the recesses. The ring is released and secures the element against motion with respect to the sleeve. When the latter is driven in rotation with respect to the element, the bosses take their bearing on the second surface portion of the recesses and compress the ring.

In the field of application of the device according to the invention there can be mentioned, by way of non-limitative examples, the connection of two sections of a seismic streamer to be used for underwater seismic prospecting or the connection of two electric cable ends.

Figure 2:
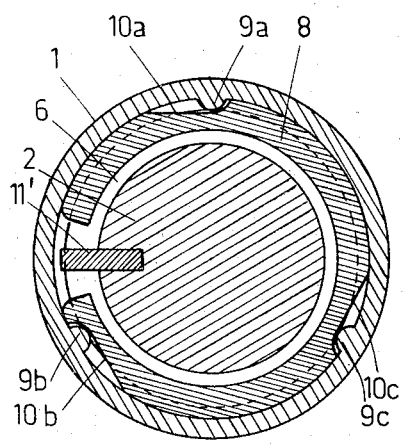
Figure 3:
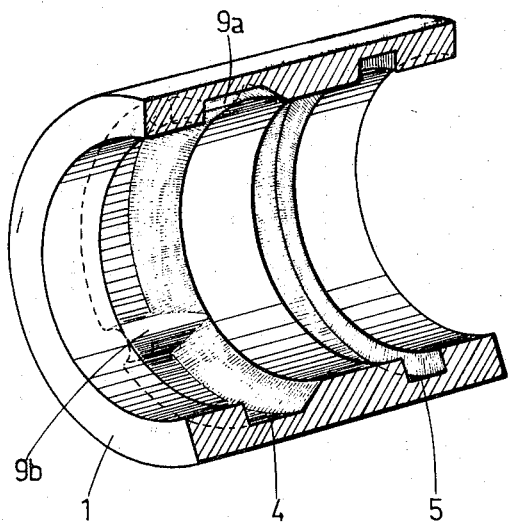

The structure, the operation and the advantages of the device will be more clearly apparent from the following description given with reference to the accompanying drawings wherein:

FIG. 1 diagrammatically shows a cross-sectional view of the assembly formed by the sleeve and the elements in a connection position, FIG. 2 diagrammatically shows a cross-sectional view along line AA of FIG. 1 showing the means for compressing a deformable ring, and FIG. 3 a perspective, partly cross-sectional, view of the arrangement of the internal wall of the sleeve.

The device illustrated in FIG. 1 comprises a substantially cylindrical sleeve 1 for connection of the element ends 2 and 3 also substantially cylindrical. The sleeve comprises on its inner surface two circular recesses 4 and 5. Circular grooves 6 and 7 are also provided respectively in the external surface of elements 2 and 3 so that, when the latter are in a position of connection in the sleeve, the grooves 6 and 7 are facing the recesses 4 and 5. Two deformable rings 8 and 11 are respectively placed into the grooves 6 and 7. The ring 11 is, for example, a metal ring having a portion of its circumference cut off and which can be compressed inside the groove 7. With the ring 11 in a compressed state, the element 3 is introduced inside the sleeve.

When the groove 7 registers with the recess 5, the ring 11 expands and prevents any translation of element 3 with respect to the sleeve. By this type of fixation, however, the element 3 can freely rotate inside the sleeve.

In FIGS. 2 and 3 it can be seen that recess comprises three groove portions separated from one another by bosses 9a, 9b and 9c and that the deformable ring 8, consisting, for example, of a metal ring having a portion of its circumference cut off, comprises three recesses 10a, 10 b and 10 c arranged in its peripheral wall. The element 2 is introduced into the sleeve 1 while compressing the ring 8 inside the groove 6. The ring 8 is placed in such an angular position that, when the groove 6 registers with recess 4, the bottoms of recesses 10 a, 10 b and 10 c are pressed against the bosses. This positioning is insured by means for angular marking provided on element 2 and sleeve 1 and which have to register with each other. The depth of the recesses is so adjusted that the ring 8 be released in the normal position of fixation of the element 2 to the connection sleeve 1.

The shape of the recesses 10 a, 10 b and 10 c is so designed that a rotation of the sleeve with respect to the element 2 in a predetermined direction (counter-clockwise rotation in the figure) results in a sufficient compression of the ring 8 for releasing the same from recess 4 and enabling its disconnection. The shape of recesses 10 a, 10 b and 10 c precludes the compression of the ring 8 through a rotation in the opposite direction. There can be provided however, if desired, recesses adapted for a compression of the ring by rotation of the sleeve in either direction with respect to element 2. The element 2 comprises a stop member 11 for preventing the rotation of ring 8.

With reference to FIG. 1, it is apparent that the ring 8 may be provided with a bevelled edge 8 a whereby it can be introduced more easily into the sleeve and that element 2 has a cylindrical extension 2 a which penetrates into a bore 3 a of element 3.

It is however obvious that elements of a different shape than that illustrated in FIG. 1 can be connected by the device of the invention. The elements 2 and 3 may also consist, for example, of electric cables provided, at their ends, with electric connectors for the mutual connection of conductor bunches.

It is still within the scope of the invention to replace the deformable ring 11 by any other device for preventing translation of element 3 while leaving it free to rotate. It will be understood that this invention is susceptible to modifications in order to adapt it to different usages and conditions and, accordingly, it is desired to comprehend such modifications within this invention as may fall within the scope of the appended claims.

What we claim is:

1. A device for connection of two substantially cylindrical elements to the internal wall of a substantially cylindrical connecting sleeve having an internal diameter adapted to the respective diameters of the end portions of said elements, comprising means for securing at least one element to the sleeve, including at least one deformable ring housed in its expanded position in two slots facing each other, one of which, provided with bosses, being arranged in the inner wall of the sleeve and having a substantially constant depth between the boss locations, the other being arranged all around the external wall of the element and having a substantially constant depth, said element comprising a stop member for limiting the rotation of said deformable ring, and said ring further comprising, in its external wall, recesses whose surface cooperates with the bosses for compressing said ring and making the same enter the slot of the element by rotation of the sleeve with respect to the element whereby said sleeve and said element are disconnected.

2. A device for connection of two substantially cylindrical elements to the internal wall of a substantially cylindrical connecting sleeve having an internal diameter adapted to the respective diameters of the end portions of said elements, comprising means for securing at least one element to the sleeve, including at least one deformable ring housed in its expanded position in two slots facing each other, one of which, provided with bosses, being arranged in the inner wall of the sleeve, the other being arranged in the external wall of the element, said element comprising a stop member for limiting the rotation of said deformable ring, and said ring further comprising, in its external wall, recesses whose surface cooperates with the bosses for compressing said ring and making the same enter the slot of the element by rotation of the sleeve with respect to the element whereby said sleeve and said element are disconnected, wherein said stop member is a radially extending member arranged in a slot of said element between the ends of the deformable ring.

3. A device for connection of two substantially cylindrical elements to the internal wall of a substantially cylindrical connecting sleeve having an internal diameter adapted to the respective diameters of the end portions of said elements, comprising means for securing at least one element to the sleeve, including at least one deformable ring housed in its expanded position in two slots facing each other, one of which, provided with bosses, being arranged all around the inner wall of the sleeve and having a substantially constant depth between the boss locations, the other being arranged all around the external wall of the element and having a substantially constant depth, said ring further comprising, in its external wall, recesses whose surface cooperates with the bosses for compressing said ring and making the same enter the slot of the element by rotation of the sleeve with respect to the element whereby said sleeve and said element are disconnected.

4. An arrangement for detachably connecting at least one substantially cylindrical element to the internal wall of a substantially cylindrical connecting sleeve, the internal diameter of said sleeve corresponding to the external diameter of said at least one cylindrical element; said arrangement comprising: a first groove formed in said at least one cylindrical element, a second groove formed in the internal wall of said sleeve, a deformable ring member positioned in said first groove in partial circumferential engagement with said element, said ring member and said first groove being dimensioned such that a radially outward portion of said ring member extends radially outwardly of the cylindrical surface of said element adjoining said first groove and a radially inward portion of said ring member extends radially inwardly of the cylindrical surface of said element adjoining said first groove when said ring member is in an unstressed condition, said internal wall of said sleeve being engageable with said radially outward portion of said ring member to compress said ring member and permit insertion of said element into said sleeve to a position where said first and second grooves are in facing relationship and said ring member expands into said second groove to connect said element with said sleeve, disconnecting means including respective engageable abutting surface portions on said sleeve and said ring member for compressing said ring member into said first groove upon relative rotation of said ring member and said sleeve to permit disconnection of said element from said sleeve, and a stop member mounted on said element for limiting relative rotation of said ring member and said element, wherein said ring member is slotted at one position on its periphery, and wherein said stop member includes a radially extending projection positioned between the ends of the ring member.

5. An arrangement for detachably connecting at least one substantially cylindrical element to the internal wall of a substantially cylindrical connecting sleeve, the internal diameter of said sleeve corresponding to the external diameter of said at least one cylindrical element; said arrangement comprising: a first groove formed in said at least one cylindrical element, a second groove formed in the internal wall of said sleeve, a deformable ring member positioned in said first groove in partial circumferential engagement with said element, said ring member and said first groove being dimensioned such that a radially outward portion of said ring member extends radially outwardly of the cylindrical surface of said element adjoining said first groove and a radially inward portion of said ring member extends radially inwardly of the cylindrical surface of said element adjoining said first groove when said ring member is in an unstressed condition, said internal wall of said sleeve being engageable with said radially outward portion of said ring member to compress said ring member and permit insertion of said element into said sleeve to a position where said first and second grooves are in facing relationship and said ring member expands into said second groove to connect said element with said sleeve, and disconnecting means including respective engageable abutting surface portions on said sleeve and said ring member for compressing said ring member into said first groove upon relative rotation of said ring member and said sleeve to permit disconnection of said element from said sleeve, wherein said first and second grooves and said ring member are configured such that when said ring member is in said unstressed condition, at least one of the respective radially inward and outward portions of said ring member extends the same radial distance at at least three circumferentially spaced positions on said element, and wherein said respective abutting surface portions include inwardly extending bosses on said sleeve and inwardly extending recesses in said ring member.

6. An arrangement according to claim 5, wherein the surface of said recesses comprises a first surface portion of a depth substantially equal to the height of said bosses and a second surface portion of decreasing depth for extending said first surface portion to the external wall of the ring, said second surface portion forming a bearing surface for the bosses during said rotation.

7. An arrangement for detachably connecting at least one substantially cylindrical element to the internal wall of a substantially cylindrical connecting sleeve, the internal diameter of said sleeve corresponding to the external diameter of said at least one cylindrical element; said arrangement comprising: a first groove formed in said at least one cylindrical element, a second groove formed in the internal wall of said sleeve, a deformable ring member positioned in said first groove in partial circumferential engagement with said element, said ring member and said first groove being dimensioned such that a radially outward portion of said ring member extends radially outwardly of the cylindrical surface of said element adjoining said first groove and a radially inward portion of said ring member extends radially inwardly of the cylindrical surface of said element adjoining said first groove when said ring member is in an unstressed condition, said internal wall of said sleeve being engageable with said radially outward portion of said ring member to compress said ring member and permit insertion of said element into said sleeve to a position where said first and second grooves are in facing relationship and said ring member expands into said second groove to connect said element with said sleeve, disconnecting means including respective engageable abutting surface portions on said sleeve and said ring member for compressing said ring member into said first groove upon relative rotation of said ring member and said sleeve to permit disconnection of said element from said sleeve, and means for connecting a second cylindrical element to said sleeve, said last-mentioned means including third and fourth grooves provided respectively in said second element and said sleeve for accommodating a deformable locking ring to lock said second element to said sleeve, wherein said first element includes a centrally disposed projection engageable with a corresponding centrally disposed opening in said second element when said first and second elements are connected to said sleeve.

8. An arrangement for detachably connecting at least one substantially cylindrical element to the internal wall of a substantially cylindrical connecting sleeve, the internal diameter of said sleeve corresponding to the external diameter of said at least one cylindrical element; said arrangement comprising: a first groove formed in said at least one cylindrical element, a second groove formed in the internal wall of said sleeve, a deformable ring member positioned in said first groove in partial circumferential engagement with said element, said ring member and said first groove being dimensioned such that a radially outward portion of said ring member extends radially outwardly of the cylindrical surface of said element adjoining said first groove and a radially inward portion of said ring member extends radially inwardly of the cylindrical surface of said element adjoining said first groove when said ring member is in an unstressed condition, said internal wall of said sleeve being engageable with said radially outward portion of said ring member to compress said ring member and permit insertion of said element into said sleeve to a position where said first and second grooves are in facing relationship and said ring member expands into said second groove to connect said element with said sleeve, and disconnecting means including respective engageable abutting surface portions on said sleeve and said ring member for compressing said ring member into said first groove upon relative rotation of said ring member and said sleeve to permit disconnection of said element from said sleeve, wherein said first and second grooves and said ring member are configured such that when said ring member is in said unstressed condition, at least one of the respective radially inward and outward portions of said ring member extends a similar radial distance at at least two circumferentially spaced positions on said element, and wherein each of said first and second grooves extend with a substantially constant depth around the respective element and the internal wall of said sleeve.

9. An arrangement for detachably connecting at least one substantially cylindrical element to the internal wall of a substantially cylindrical connecting sleeve, the internal diameter of said sleeve corresponding to the external diameter of said at least one cylindrical element; said arrangement comprising: a first groove formed in said at least one cylindrical element, a second groove formed in the internal wall of said sleeve, a deformable ring member positioned in said first groove in partial circumferential engagement with said element, said ring member and said first groove being dimensioned such that a radially outward portion of said ring member extends radially outwardly of the cylindrical surface of said element adjoining said first groove and a radially inward portion of said ring member extends radially inwardly of the cylindrical surface of said element adjoining said first groove when said ring member is in an unstressed condition, said internal wall of said sleeve being engageable with said radially outward portion of said ring member to compress said ring member and permit insertion of said element into said sleeve to a position where said first and second grooves are in facing relationship and said ring member expands into said second groove to connect said element with said sleeve, and disconnecting means including respective engageable abutting surface portions on said sleeve and said ring member for compressing said ring member into said first groove upon relative rotation of said ring member and said sleeve to permit disconnection of said element from said sleeve, wherein said first and second grooves and said ring member are configured such that when said ring member is in said unstressed condition, at least one of the respective radially inward and outward portions of said ring member extends a similar radial distance at at least two circumferentially spaced positions on said element, and wherein bottom surfaces of said first and second grooves extend on concentric circles around a longitudinal axis of said element when said element and said sleeve are connected with said ring member in said unstressed condition.

* * * * *